United States Patent [19]

Coblenz et al.

[11] Patent Number: 5,312,791
[45] Date of Patent: May 17, 1994

[54] PROCESS FOR THE PREPARATION OF CERAMIC FLAKES, FIBERS, AND GRAINS FROM CERAMIC SOLS

[75] Inventors: William S. Coblenz, Arlington, Va.; Michael D. Kavanaugh, North Grafton, Mass.

[73] Assignee: Saint Gobain/Norton Industrial Ceramics Corp., Worcester, Mass.

[21] Appl. No.: 933,161

[22] Filed: Aug. 21, 1992

[51] Int. Cl.$^5$ .............................................. C04B 35/10
[52] U.S. Cl. ...................................... 501/153; 34/285; 501/127
[58] Field of Search ................. 501/12, 153, 154, 127; 51/309; 34/5

[56] References Cited

U.S. PATENT DOCUMENTS

| | | | |
|---|---|---|---|
| 1,949,360 | 2/1934 | Schorger | 23/113 |
| 3,616,542 | 11/1971 | Rader | 34/5 |
| 3,681,017 | 8/1972 | Butcher et al. | 34/5 |
| 3,731,391 | 5/1973 | Schweizer | 34/5 |
| 3,916,532 | 11/1975 | Jaeger | 34/5 |
| 4,122,041 | 10/1978 | Mahler | 252/449 |
| 4,230,679 | 10/1980 | Mahler et al. | 423/325 |
| 4,339,540 | 7/1982 | Beall et al. | 501/3 |
| 4,595,545 | 6/1986 | Sane | 264/65 |
| 5,007,943 | 4/1991 | Kelly et al. | 51/295 |
| 5,104,424 | 4/1992 | Hickory et al. | 51/309 |
| 5,230,162 | 7/1993 | Oyler, Jr. | 34/5 |

FOREIGN PATENT DOCUMENTS 371895A 6/1990 European Pat. Off. .
356461A 7/1990 European Pat. Off. .

OTHER PUBLICATIONS

Walter Mahler & Max F. Bechtold; Freeze-Formed Silica Fibers; Nature vol. 285, No. 5759, May 1, 1990; pp. 27-28.
W. Mahler and U. Chowdhry; Morphological Consequences of Freezing Gels; equal to article published in Ultrastructure Processing of Ceramics, Glasses and Composites; edited by L. L. French & D. R. Ulrich, John Wiley & Sons (1984); pp. 207-217.
Toshio Maki et al.; "Formation of Oxide Fibers by Unidirectional Freezing of Gel"; Bull. Inst. Chem. Res., Kyoto University; vol. 64, No. 4, 1986 pp. 292-305.
Tadashi Kokubo et al., "Preparation of Amorphous $ZrO_2$ Fibers by Unidirectional Freezing of Gel"; Journal of Non-Crystalline Solids 56 (1983); pp. 411-416.
Sumio Sakka; "Formation of Glass and Amorphous Oxide Fibers From Solution"; Mat. Res. Soc. Syn. Proc. vol. 32 (1984), pp. 91-99.

Primary Examiner—Karl Group
Assistant Examiner—A. Wright
Attorney, Agent, or Firm—David Bennett

[57] ABSTRACT

A process for producing ceramic flake, fiber and grain materials comprising solidifying a hydrated alumina sol, freeze drying the solidified sol and thereafter sintering the freeze dried material is disclosed. Novel ribbed flake material made by the process of the present invention is also disclosed.

18 Claims, No Drawings

PROCESS FOR THE PREPARATION OF CERAMIC FLAKES, FIBERS, AND GRAINS FROM CERAMIC SOLS

TECHNICAL FIELD

The present invention is directed to a process for producing ceramic flake, fiber, and grain materials by the solidification of ceramic sols and the products produced from the materials. The process generally comprises the solidification of an alumina sol by freezing it, freeze drying the sol, and then sintering the freeze dried material. The products of the process of this invention are useful as abrasive grains for lapping, vitreous bonded products, coated abrasives, polymer and ceramic matrix composites, shaped abrasive grain, and one-step grinding wheels.

BACKGROUND OF THE INVENTION

In the prior art there are numerous processes which are directed to the solidification of ceramic gels by employing various freezing and thawing techniques. Schorger, U.S. Pat. No. 1,949,360, discloses a process for producing aluminosilicate base-exchange gels by freezing mixed gels formed from sodium aluminate and sodium silicate. Schorger used a freeze-thaw technique and preferred a freezing temperature low enough to form ice crystals but not so low as to freeze the water in the ice-compacted gel. Water expands approximately 9 volume % on freezing and thus expansion would adversely effect the strength of the gel granules after thawing and drying according to Schorger. Mahler and coworkers have worked with directional solidification of silicic acid gels. See Mahler U.S. Pat. Nos. 4,122,041 and 4,230,679, W. Mahler, M. F. Bechtold, "Freeze-formed silica fibers", *Nature*, Vol. 285, No. 5759, May 1, 1980, pp 27–28, and W. Mahler and V. Chowdhry, "Morphalogical Consequences of Freezing Gels", published in *Ultastructure Processing of Ceramics, Glasses, and Composites*, edited by L. L. Hench and D. R. Ulrich, John Wiley and Sons (1984), pp. 207–217. After freezing, the polysilicic acid undergoes accelerated, concentration dependent polymerization and is rendered insoluble. Silicic acid will polymerize at room temperature under acidic conditions. The aging time, concentration and pH have a great effect on the range of product shapes obtained on freezing. Typical gels must be aged for 6 days before fibers can be obtained from them.

An extensive review of fiber formation by directional freezing of gels is discussed in T. Maki et al., "Formation of Oxide Fibers by Unidirectional Freezing of Gel", *Bull Inst. Chem. Res.*, Kyoto University, Vol. 64, No. 4 (1986) pp. 292–305. Three requirements for fiber formation are discussed. First, the starting sol must contain oxide particles larger than a certain size which do not come out of the cellulose tube in dialysis. The concentration of oxide component must be sufficiently high to fill the spaces between fibrous ice crystals, so that the oxide fibers in the frozen gel might be continuous. (The sol is converted to a gel by means of dialysis which is a slow process often taking days.) The oxide particles of the sol must be mobile so that they may be rearranged into the spaces between ice fibrous crystals upon unidirectional freezing of gel. Second, dialysis must be carried out for a long time sufficient for removal of the electrolytes, such as chloride, acetate or alkali ions. If a small amount of electrolytes still remain after dialysis, oxide particles might not make chemical bonds with each other in the freezing process. However, for some oxides, the dialysis time is limited by possible cracks in the gel cylinder, since the continuity of fibers may be interrupted by such cracks. The third requirement has to do with solidification conditions. The rate of immersion of gel cylinder into the cold bath should be in an appropriate range, so that cellular growth of ice fibrous crystals might take place. The preceding three requirements are general to all oxides. The reference discusses these requirements relative to gels formed from alumina sols. The alumina sols ranged from from 0.5 to 2.0 moles/liter; were stabilized with $NO^-$, $Cl^-$ or $CH_3COO^-$; and had starting pH's ranged between 3.5 and 5.0. The sols were transformed to gels by dialysis in cellulose tubes with distilled water at 25° C. for times up to 30 days. Unidirectional freezing was accomplished by lowering the gel cylinders into a cold bath at −78° C. at rates of 3 to 13 cm/hr. Not all gels will produce fibers. A dialysis time of 18 to 30 days was required to convert the sols to firm gels suitable for freezing. Freezing ranges lower than 3 cm/hr or higher than 13 cm/hr produced granules of short fibers. Rates between 6 and 9 cm/hr produced continuous fibers for the specific sol studied. Maki et al have also prepared titania and zirconia fibers using the gel solidification and thaw technique.

Kokulo et al, "Preparation of Amorphous $ZnO_2$ Fibers by Unidirectional Freezing of Gel," *Journal of Non-Crystalline Solids*, 56 (1983), 411–416 disclose a process for producing long amorphous fibers by the unidirectional freezing of zirconia hydrogel. Other gel freezing processes are disclosed by Sakka in "Formation of Glass and Amorphous Oxide Fibers from Solution" *Mot. Res. Soc. Syn. Proc.*, Vol. 32 (1984), pp 91–99 and EP Pub. No. 371,B95.

EP 356,461 discloses forming a sintered article from particulate material by freezing a mixture of freezable liquid, a gelling material, and ceramic particles. It does not disclose any sols.

As is apparent from a review of each of the above discussed pieces of prior art, the preparation of gels suitable for directional solidification is tedious, often requiring days of dialysis time. Also, the solidification rate of gels must be exceeding slow so as to be able to form useful products. Thus a gel freeze-thaw technique would be difficult to scale up.

Accordingly, it is an object of the present invention to develop a process for producing ceramic flake products by the solidification of ceramic sols, rather than gels.

It is another object of the invention to employ a solidification process which is easy to scale-up, relatively fast, and easy to commercialize.

It is still another object of this invention to produce ceramic flakes of various sizes and shapes.

SUMMARY OF THE INVENTION

Accordingly, the present invention is directed to a process for producing ceramic flakes, fibers and grains by the solidification of a ceramic sol. The process generally comprises directionally solidifying a ceramic sol such as a sol containing boehmite. The solidification is carried out by freezing the sol either rapidly by exposure to temperatures of about that of liquid nitrogen or below or more gradually, depending upon the desired end product. During the solidification process, ice crystals grow and exclude the ceramic particles which are concentrated between the growing ice crystals. The frozen mass of ice crystals and ceramic material is then freeze dried to remove the water while preventing destruction of the flakes, fibers, and grains, which have been formed and which would be destroyed upon thawing. The dried flakes, fibers, or grains are finally sintered, thereby producing dense polycrystalline ceramic materials.

The process of the present invention is superior to the prior art gel solidification processes in that the solidification rate of sols of this invention can be very rapid in comparison to the slow rates required to achieve solidification of gels, making the present process easy to scale-up and commercialize.

The resulting ceramic products of the process of the present invention have many uses. These uses include abrasive grain for lapping, vitrious bonded products, coated abrasives, organic bonded grinding applications, one-step grinding wheels and fillers for wear resistant paints.

DETAILED DESCRIPTION OF THE INVENTION

More particularly, the first step of the process of the present comprises forming a ceramic sol. The sol is prepared by adding a dry hydrated alumina, such as microcrystalline boehmite, to water along with a peptizing agent such as nitric acid, acetic acid, phosphoric acid, hydrochloric acid, or the like. While not preferred, the sol may further include up to about 10–15 weight % of a spinel, mullite, manganese dioxide, titania, magnesia, ceria, zirconia, or a zirconia precursor which can be added in larger amounts, e.g. 40% or more, or other compatible additives or precursors thereof. The additives are normally included to modify such properties as fracture toughness, hardness, friability, fracture mechanics, or drying behavior. The hydrated alumnia is generally present in an amount of from about 5 to 30% by weight, more preferably in an amount of from about 8 to 25% by weight and most preferably in an amount of from about 10 to 20% by weight of the sol. The peptizing agent is generally present in an amount of about 1 to 10 g per 100 grams of hydrated alumina, preferably about 2 to 8 g, and more preferably about 4 to 6.5 g.

In addition, a suitable seed material such as an alpha alumina seed slurry or a precursor thereto may be added to the sol. Suitable seeds are well known in the art and include $\alpha$-$Fe_2O_3$, $\alpha$-$Al_2O_3$, $\alpha$-$Cr_2O_3$, and the like. The seed material is generally added in an amount sufficient to facilitate the conversion of the hydrated alumina particles to alpha-alumina upon sintering. The amount of seed material should generally not exceed about 10 weight % of the hydrated alumina and there is normally no benefit to amounts in excess of about 5%. If the seed is adequately fine (preferably having a surface area of about 60 $m^2$ per gram or more), amounts of from about 0.5 to 10% may be used with about 1 to 5% being preferred. The seeds may also be added in the form of a precursor thereto, such as a ferric nitrate solution.

The sol may also be doped with silica. When doping is desired, boric acid is first added to the alumina sol to prevent gelation upon the addition of silica. Boric acid is typically added to give about 3 grams of $B_2O_3$ equivalent per 97 grams $SiO_2$ equivalent. The silica is preferably added in the form of tetraethylorthosilicate (TEOS) which can be hydrolyzed while refluxing the alumina sol. Silica doped sols without alpha seeds added demonstrated that a submicron alpha-alumina, resistant to grain growth, could be obtained using grain growth inhibition rather than seeding to control the gamma to alpha transformation during sintering.

After the formation of the alumina sol, solidification of the sol is carried out. Solidification may be effected by freezing the sol either rapidly or slowly depending upon the desired properties of the final product as will be explained in greater detail hereinafter. By "rapid" is meant that the freezing is performed by exposing the sol to temperatures of about that of liquid nitrogen, i.e. about 77° K., or below. The rapid freezing may be accomplished by any suitable means known in the art although a preferred rapid solidification procedure involves immersing a sol contained in a suitable container such as a tray or cylinder into liquid nitrogen. A relatively slower solidification may be carried out by placing the sol in a freezer and allowing the sol to freeze at temperatures of from about −40° C. to −10° C. for about 0.5 to 24 hrs.

After solidification, the resulting product is freeze dried to remove the ice/water. While other methods of removing the water may be employed, freeze drying is preferred since it prevents repeptizing, i.e. redispersion of the hydrated alumina, which would occur upon thawing. The freeze drying may be carried out by any means known in the art and generally comprises placing the material to be freeze dried in a freeze drier for about 16 to 48 hrs at a temperature of about 10° to 50° C. and at a vapor pressure below the triple point of water. When the initial solidification step is performed in a freeze drier, this subsequent water removal step can be accomplished without physically moving the material.

The next step of the process comprises sintering the dried material at a temperature sufficient to convert the alumina to alpha alumina. Suitable such temperature are generally from about 1,200° to 1,350° C. for about 0.5 to 2 hours. The resulting product will take a variety of different forms ranging from dense flakes to dense fibers to grains depending upon the processing conditions. Flakes produced during a rapid solidification process contain ribs on their surface. Such flakes are generally of about 0.5 to 3 microns thick. The ribs on the flakes are unique and particularly beneficial when the flakes are used in polymer or metal matrix composites. The ribs generally extend along the surface of the flakes and are generally about 0.5 to 4 microns thick and have a height of about 0.5 to 1 micron, as measured from the surface of the flake. Such flakes with ribs are shown in FIG. 1. These flakes were produced in Example 1. The ribs increase the stiffness of the plates and act as 'standoffs' to insure that the matrix (metal or polymer) surrounds the reinforcement. The ribs also act to mechanically lock the flakes into the matrix thereby reducing the possibility of structural flaws in a product made with the flakes.

If a slower solidification rate is used with a freezer at a temperature of from about −40° to −10° C. rather than a rapid solidification, much thicker flakes, i.e. having a thickness of about 10 to 50 microns, are produced. Furthermore, such flakes do not possess the ribs that are found on the flakes produced using the more rapid solidification procedure.

The shape of the final product may be further varied by adjusting the solids content of the sol. By increasing the solids, i.e. hydrated alumina, content of the sol, the product becomes more flake-like in appearance. Products which are produced from sols having a solids content of 10% or less are more fiber or rod-like having a length of about 40 to 60 microns and a diameter of about ¼ to 3 microns.

Flake-like products rather than fiber-like products are generally produced from silica doped sols stabilized with boric acid. Such products contain a significant amount of amorphous material. In contrast, rapid solidification of the sol formed by coating hydrated alumina particles with silica results in particulate products about 1 to 3 millimeters in diameter. The silica additions impede grain growth resulting in extremely fine grains. The silica addition is so effective at reducing grain growth that seeds of alpha-$Al_2O_3$ are not needed. This then offers a possible method of making abrasive grits to size.

The products of the solidification process have many potential uses, including abrasive grain for lapping vitreous bonded products, coated abrasives and organic bonded grinding applications. This process has the capability to produce unique shapes, flakes, fibers, grains and equalized shapes. Directional solidification of sols or dispersions may be used to form shaped preforms for composites (metal, ceramic or polymer matrix). One step grinding wheels may be manufactured which would be the ceramic analogy to a wire brush. Flake products may be used in discontinuous polymer or metal matrix composites. The ribbed flakes work well in these composites because the ribs increase strength (micro I-Beams) and act to mechanically lock the plate into the matrix. The ribs also act as 'stand-offs' to prevent face-to-face contact of plates. A flake filler for a wear resistant paint is another possible use.

The invention will now be described with reference to the following Examples, which are not intended to be interpreted as limiting the scope of the invention. All parts and percents are by weight unless otherwise stated.

EXAMPLE 1

A 10 wt % solids sol containing boehmite (1 g), nitric acid (15M, 0.06 cc), alpha alumina seed having a surface area of about 100 $m^2/g$ (0.25 g) and water (9 ml) was prepared by mixing in a flask, refluxed at the boiling point of the acid/-$H_2O$ for 2 hours, and then cooled to room temperature. The sol was divided into two equal parts. One part was diluted by the addition of 5 ml water and the other by the addition of 15 ml. Each sol was then placed in a graduated cylinder and submerged in liquid $N_2$. After freezing, each of the cylinders was submerged in room temperature $H_2O$ just long enough to enable the frozen pieces to slide out. Each of the frozen sol materials was then placed in a freeze drier for 60 hrs. at a temperature of 40° C. at a pressure below the triple point of water. During the freeze drying, some pieces broke and mixed together. However, the flakey radial structure was retained in some pieces due to the directional freezing from the walls of the container inward. Portions of each of the resulting products were fired at 1250° C. and 1300° C., for hr in all cases. The resulting flakes had a thickness of 3-5 μm as measured by a scanning electron microscope (SEM).

EXAMPLE 2

A 20 wt % solids sol containing boehmite (375 g), nitric acid (15.4M, 12 cc), an alpha alumina seed as in Example 1 (98 g), and water (1.5 l) was prepared and refluxed at the boiling point of the acid/$H_2O$ for 2 hrs and then cooled to room temperature. The sol was then poured into a stainless steel pan and placed on the shelf of a freeze drier at —40° C. until frozen. The product after freeze drying as in Example 1 was flakey with the flakes about 1-10 mm across and <1 mm thick). Finally, the flaky material was fired to 1300° C. for one hour at a rate of 100° C./hr. The resulting alpha alumina material was flakey in appearance and the flakes had a thickness of 15-20 μm as measured by SEM. Also, the flakes were somewhat stronger, less pliable, and harder to deform than the flakes of Example 1.

EXAMPLE 3

A 20 wt % solids sol containing boehmite (375 g), nitric acid (15.4M, 12 cc), alpha alumina seed material as in Example 1 (98 g) and water (1.5 l) was prepared and refluxed for 2 hrs at the boiling point of the acid/$H_2O$ and then cooled. The sol was poured into a stainless steel tray and then partially submerged in liquid $N_2$. The resulting material was placed in a freeze drier for 60 hrs at a temperature of 40° C. and at a pressure below the triple point of water. The material appeared flakey after freeze drying. Thereafter, the material was fired at a rate of 100° C./hr up to a temperature of 1300° C. at which temperature it was held for 1 hr. The resulting material was flakey in appearance and had a thickness of 1-2 μm as measured by SEM.

EXAMPLE 4

A 20 wt % solids sol containing boehmite (375 g), nitric acid (15.4M, 12 cc), an alpha alumina seed material as in Example 1 (98 g) and water (1.5 l) was prepared and refluxed at the boiling point of the acid/$H_2O$ for 2 hours and then cooled. The resulting sol was poured into a stainless steel tray and placed in a shelf in a freeze at —40° C. for 10 hrs until frozen. After freeze drying as in Example 1, the resulting material was fired for 5 min. at 900° C., for 10 min at 1100° C. for 1 hr, for 30 min at 1200° C. and for 10 min at 1300° C. The fired material had a flakey appearance and a thickness of about 15 μm.

EXAMPLE 5

A 10 wt % solids sol containing boehmite (106 g), nitric acid (15.4M, 3.5 cc) and water (0.897 l) was prepared. A separate sol containing TEOS (33.6 g), $H_2O$ (5.8 ml), isopropyl alcohol (60 cc), nitric acid (15.4M, 0.63 cc), and boric acid (0.53 g) was prepared. The first sol was refluxed for two hours and then the second sol was added thereto to give a 10 wt % $SiO_2:B_2O_3$ sol containing 3% $B_2O_3$. The resulting sol was cooled, poured into a stainless steel pan, and partially submerged in liquid N2 to effect freezing. The resulting material was then freeze dried as in Example 1. A portion was fired at 1,300° C. for 3 hr and produced a flakey material comprising alpha-alumina and mullite. The flakes were about 1-3 μm thick.

EXAMPLE 6

A 20 wt % solids sol containing boehmite (559 g), alpha alumina seed material as in Example 1 (146 g), nitric acid (15.4M, 18 cc) and water (1.8 l) was prepared. The sol was maintained at reflux for two hours at the boiling point of the acid/$H_2O$ and then tetraethylorthosilicate (TEOS) (an $SiO_2$ source) (86.7 g) was added to the refluxing sol after 1.5 hrs as a 3 wt % solution. The sol gelled within 20 minutes of the TEOS addition.

Without cooling, the sol was then added to a stainless steel pan and placed in a freeze drier at −40° C. The resulting material was gritty, like coarse sand. Thereafter, the gritty material was fired at 1300° C. for 3 hrs. Elongated grains at the surface were identified by SEM. X-ray defraction (XRD) identified the material as all alpha alumina with no mullite.

EXAMPLE 7

A 10 wt % solids sol containing boehmite (588 g), nitric acid (15M, 18.8 cc), alpha alumina seed material as in Example 1 (153 g), and water (4.7 l) was prepared and refluxed at the boiling point of the acid/H$_2$O for 2 hrs. and then cooled to room temperature. The resulting sol was then placed in a stainless steel tray and partially submerged in liquid N$_2$ until frozen. The material was then freeze dried as in Example 1. Thereafter, the freeze dried material was fired at 1300° C. for 3 hrs. The resulting material was flakelike in appearance and 1-2 μm in thickness as measured by SEM.

EXAMPLE 8

Two separate batches of 20 wt % solids sols were prepared, each containing boehmite (582 g), a silica source (TEOS) (16.8 g to give 1% SiO$_2$), boric acid (0.133 g) to give B$_2$O$_3$ (3% of the SiO$_2$), nitric acid (15M, 18.9 cc), water (2 l), and an alpha alumina seed material of Example 1 (149 g), and refluxed at the boiling point of the acid/H$_2$O for 2 hrs. After refluxing the sol for 30 minutes, the TEOS was added to each sol which were cooled to room temperature. The material became highly viscous after stirring for 3 days, but did not gel. Thereafter, the material was placed in stainless pans and each batch was placed in a freeze drier and frozen at −40° C. Thereafter, the water was removed as in Example The resulting material appeared as shiny flakes and appeared thicker than that produced from plain boehmite sols. The material was then fired at 1300° C. for 3 hrs as 2 separate batches and yielded all alpha-alumina flakes (containing no mullite) about 50 μm thick as measured by SEM.

What is claimed is:

1. A process for producing a ceramic material comprising:
   (i) freezing a sol comprising a hydrated alumina material so as to obtain a frozen aqueous phase and a solid hydrated alumina phase;
   (ii) drying the solid hydrated alumina by removing the frozen aqueous phase without causing redispersion in water of the solid hydrated alumina; and therafter
   (iii) sintering the dried hydrated alumina to produce a ceramic material.

2. The process of claim 1, wherein the sol is rapidly frozen at a temperature of about 77° K.

3. The process of claim 2, wherein the rapid freezing comprises at least partially emersing the sol in liquid N$_2$.

4. The process of claim 1, wherein the freezing step comprises slowly freezing the sol at a temperature of from about −40° to 0° C.

5. The process of claim 1, wherein the drying step is carried out by freeze drying at a temperature of from about −20° to about 40° C. for about 1 to 100 hours at a pressure below the triple point of water.

6. The process of claim 1, wherein the sintering is carried out at a temperature of from about 1,200° to 1,350° C.

7. The process of claim 6, wherein the sintering is carried out for from about 0.5 to 4 hrs.

8. The process of claim 1, wherein the sol additionally contains nitric acid and water.

9. The process of claim 1, wherein the sol additionally contains from about 0.5 to about 10% by weight of an alpha-alumina seed material.

10. The process of claim 1, wherein the sol additionally contains SiO$_2$.

11. The process of claim 1, wherein the sol additionally contains an alpha-alumina seed material and SiO$_2$.

12. The process of claim 1, wherein the sol is prepared by preparing 2 separate pre-sols, the first pre-sol comprising hydrated alumina and the second pre-sol comprising SiO$_2$ or a source thereof, refluxing the first pre-sol and adding to the first pre-sol during the refluxing process the second presol thereby forming the sol.

13. The process of claim 12, wherein the first pre-sol additionally contains an alpha-alumina seed material.

14. The process of claim 1, wherein the sol is refluxed and then cooled prior to freezing.

15. The process of claim 1, wherein the hydrated alumina is boehmite.

16. The process of claim 15, wherein the boehmite is present in an amount of from about 5 to 30% by weight of the sol.

17. The process of claim 16, wherein the boehmite is present in an amount of about 10 wt %.

18. The process of claim 16, wherein the boehmite is present in an amount of about 20 wt %.

* * * * *